Aug. 15, 1967                    G. HIRS                3,335,862
                           MULTIPLE SHELL FILTERS
Filed Feb. 28, 1964                                  2 Sheets-Sheet 1
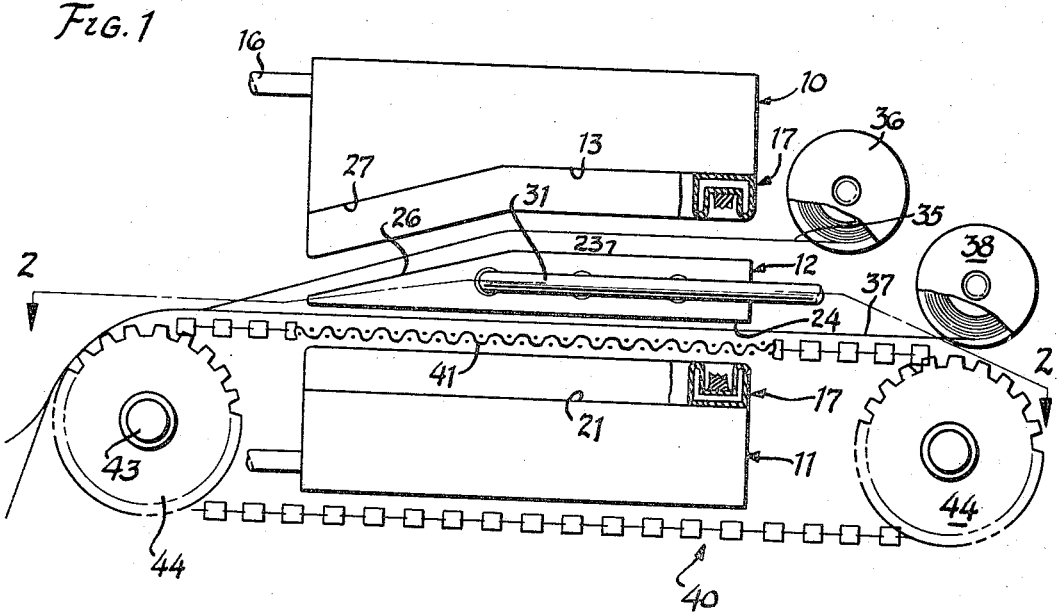
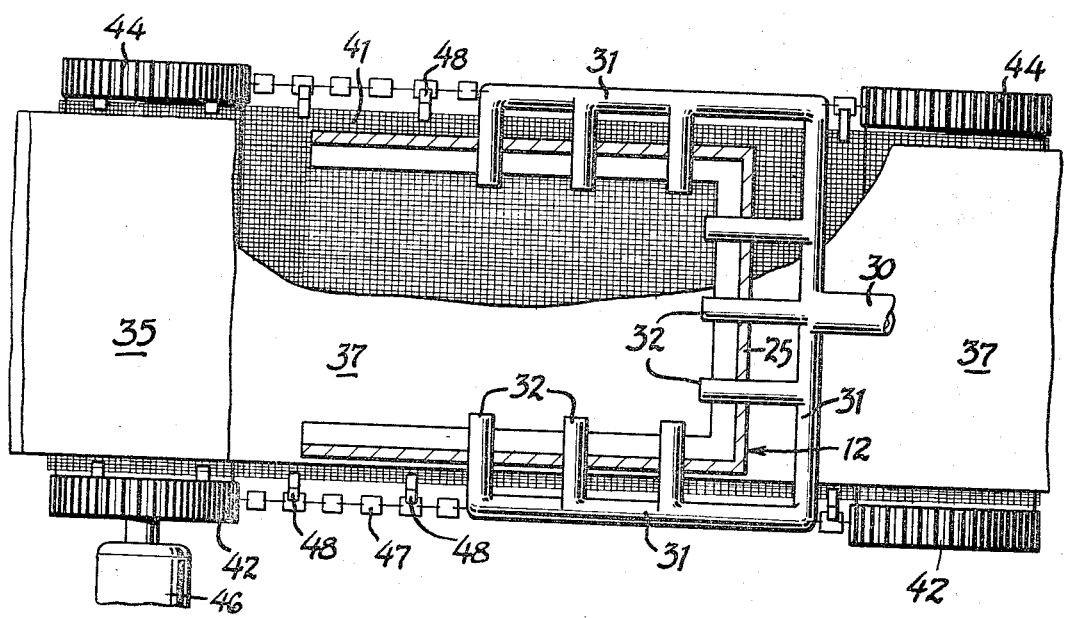
INVENTOR.
GENE HIRS
BY
WILSON, SETTLE &
        CRAIG
ATTORNEYS Aug. 15, 1967  G. HIRS  3,335,862
MULTIPLE SHELL FILTERS
Filed Feb. 28, 1964  2 Sheets-Sheet 2

INVENTOR.
GENE HIRS
BY
WILSON, SETTLE &
CRAIG
ATTORNEYS

United States Patent Office 3,335,862
Patented Aug. 15, 1967

3,335,862
MULTIPLE SHELL FILTERS
Gene Hirs, 6865 Meadowlake, Birmingham, Mich. 48010
Filed Feb. 28, 1964, Ser. No. 348,118
9 Claims. (Cl. 210—65)

The present invention relates to a filtering apparatus and method, and more particularly relates to a method of and apparatus for filtration of contaminant fluid by utilizing two separate and distinct filter media and three fluid conducting shells or casings.

In the filtration of fluids having suspended therein contaminant particles, a disposable filter medium, such as paper, has been proposed, the medium being clamped between a pair of relatively movable fluid-conducting shells. An apparatus of this type is illustrated and described in my United States Letters Patent No. 2,867,325. In my United States Letters Patent No. 2,867,324, I have proposed the utilization of an inflatable seal for sealing superimposed fluid conducting shells to one another with a filter medium interposed therebetween.

The present invention constitutes an improvement on and further development of this invention in that it proposes the utilization of a plurality of filter media with the contaminated fluid being introduced therebetween, so that both the media can be utilized simultaneously for filtration.

More specifically, the present invention proposes the utilization of a pair of spaced, fluid-conducting shells having a third or medial shell interposed therebetween, the third shell being sealed to each of the other two shells during filtration operations. Separate disposable filter media are provided to either side of the central or medial shell, the media being clamped in filtering relation to the medial shell and one of the other shells, respectively, during filtration. Preferably, contaminated fluid is introduced into the central shell and flows through the filter media, respectively, into the others of the shells from which the filtrate can be removed. Means are provided for removing the disposable media when the media become clogged and when the seals are released from sealing engagement.

By introducing the contaminated fluid into the central shell, contaminant particles are accreted on the inner surface of the disposable media. Upon advancement and removal of the media, the contaminant is interposed therebetween, thus accommodating an efficient and clean removal of the contaminant. However, merely by adding the central shell, which can be quite small and simple in construction, the filtration capacity of the apparatus is doubled.

The method of the present invention is equally adaptable to orientation of the shells so that the filter media extend either horizontally or vertically. Further, there is substantially no limitation on the size and configuration of the shells, since the shells themselves are not displaced, the seal merely being inflated or deflated to accommodate advancement and renewal of the filter media.

It is therefore, an important object of the present invention to provide a new and improved method of and apparatus for the filtration of contaminated fluid by the utilization of two separate filter media interposed respectively, between a pair of outer shells and a medial shell.

Another important object of the present invention is the provision of a method of filtration whereby contaminated fluid is introduced into a central fluid conducting shell for flow therefrom into each of two other fluid conducting shells, a filter medium being interposed between the central shell and each of the other shells, and accreting contaminants upon the confronting surfaces of the filter media to provide for the ready and clean removal of such contaminants on renewal of the filter media.

It is a further, and no less important, object of the present invention to provide a new and improved apparatus for the filtration of contaminated fluid, and including three juxtaposed fluid shells the central of one of the shells receiving contaminated liquid and the others of the shells being utilized to remove filtrate liquid, and separate and distinct disposable filter media interposed between the central shell and each of the other shells, so that contaminants are accreted on confronting faces of the media, means being provided for removing the media from their interposed position between the shells when the media becomes clogged.

Other objects of this invention will appear in the following description and appended claims, reference being had to the accompanying drawings forming a part of this specification wherein like reference characters designate corresponding parts in the several views.

On the drawings:

FIGURE 1 is a schematic side elevational view, with parts broken away and in section, illustrating a filter apparatus of the present invention capable of carrying out the method of the present invention;

FIGURE 2 is a sectional view taken along the plane 2—2 of FIGURE 1;

Figure 3:
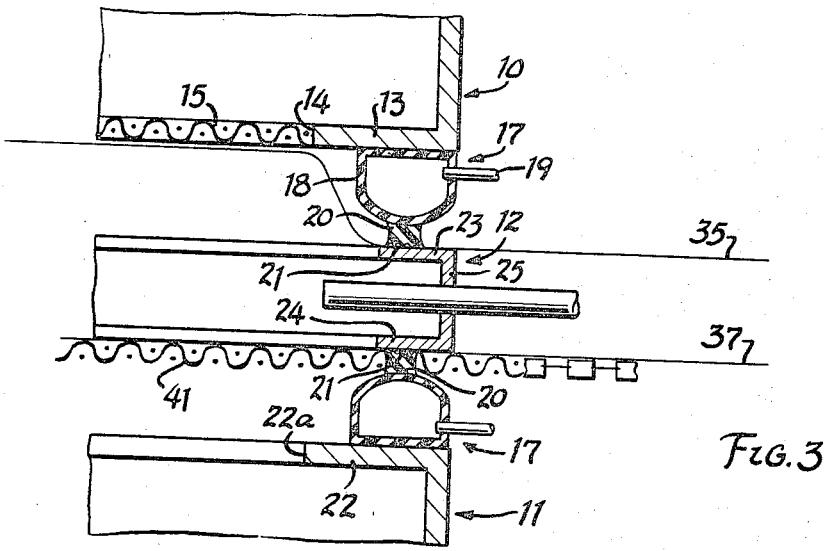
FIGURE 3 is an enlarged vertical fragmentary sectional view illustrating the apparatus of FIGURE 1 in effective filtering condition.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1, reference numeral 10 designates an upper fluid-conducting shell superimposed over and vertically aligned with a lower fluid-conducting shell 11. Interposed between the upper shell 10 and the lower shell 11 is a central or medial shell 12.

As best illustrated in FIGURE 3 of the drawings, the upper shell 10 is provided with a lower wall defined by a peripheral in-turned wall 13 centrally apertured as at 14. The central aperture carries a transversely extending screen 15 which provides a perforate covering for the opening 14. The upper shell 10 is provided with an outlet conduit 16 for a purpose to be hereinafter more fully described.

Carried by the peripheral wall 13 is an inflatable seal, indicated generally at 17, and comprising an envelope or diaphragm 18 which is adapted to receive air or similar fluid under pressure through an inlet conduit 19. The envelope 18 carries a lower striker bead 20 provided with a roughened or corrugated end surface 21. The seal element 17 is molded in a collapsed position (as indicated in FIGURE 1), so that air under pressure introduced into the conduit 19 distends the envelope 18 and projects the striker bead 20 to the position illustrated in FIGURE 3 of the drawings.

Also as indicated in FIGURE 3 of the drawings, the lower shell 11 is provided with a peripheral wall 22 surrounding a central aperture 22a and carrying an inflatable seal 17 thereon identical with the seal 17 heretofore described in connection with the upper shell 10.

The upper and lower shells 10 and 11 are generally rectangular in cross-sectional configuration, and the medial shell 12 is generally U-shaped in configuration (as shown in FIGURE 2). The medial shell 12 preferably is of a cross-sectional configuration, as illustrated in FIGURE 3 of the drawings, the shell consisting of upper and lower flanges 23, 24 joined by a vertical web 25. The flanges 23, 24 are interposed between and adapted to receive thereagainst the striker beads 20 of the seal 17. Additionally, the upper surface of the medial shell 12, i.e., the upper flange 23 thereof, is inclined as indicated at 26 (FIGURE 1) for a purpose to be hereinafter more fully described. The corresponding inclination of the upper shell portion 13, as at 27 (FIGURE 1) is necessary so that the upper seal 17 can properly seat against the inclined portion 26 of the flange 23.

Fluid under pressure is supplied to the medial shell 12 by means of a supply conduit 30, a branched header conduit 31 and transverse feeder conduits 32 which pierce the vertical web 25, as shown in FIGURE 2.

Interposed between the upper shell 10 and the medial shell 11 is a first filter medium indicated generally at 35, this medium being supplied as a web from a supply roll 36. A similar, but separate and distinct, filter medium 37 is supplied from a second roll 38 of such medium.

Interposed between the lower filter medium 37 and the lower shell 11 is a medium-supporting structure indicated generally at 40. This supporting structure comprises a fine mesh screen 41 in the form of an endless loop and trained about longitudinally spaced rolls 42. The rolls 42 are mounted on shafts 43, these shafts also carrying sprockets 44. One of the shafts, the associated sprocket and the roll 42 are driven by usitable means, as by an electric motor schematically indicated at 46. The sprockets 44 are lapped by drive chains 47 of conventional type, the chains 47 having attachment brackets 48 carried thereby and riveted or otherwise connected to the screen 41.

Obviously, upon actuation of the motor 46 the one shaft 43 will be driven to drive the sprockets 44, thereby advancing the chains 47 and the screen 41 which is trained about the rolls 42. The motor 46 drives the shafts 43 and the associated sprockets 44 in a counter-clockwise direction, as viewed in FIGURE 1 of the drawings.

As illustrated in FIGURE 3, the screen 41 overlies the seal 17 for the lower shell 11, actuation of the seal forcing the striker bead 20 thereof against the under-surface of the screen 41 to urge the screen and the paper superimposed thereon upwardly against the lower flange 24 of the medial shell 12. Similarly, inflation of the upper seal 17 forces the striker bead 20 thereof downwardly against the upper filter medium 35 to confine the filter medium against the upper flange 23 of the medial shell 12.

The operation of the device will be obvious from the foregoing description. When the seals 17 are inflated, as during normal filtration operation, the seals 17 peripherally seal the upper shell 10 to the upper surface of the medial shell 12 with the filter medium 35 interposed therebetween. Similarly, the lower seal 17 seals the lower shell 11 to the medial shell 12 with conveyor screen 41 and the lower filter medium 37 interposed therebetween.

Contaminated fluid is introduced through the conduit 30, the header conduit 31 and the individual conduits 32, into the medial shell 12. As the contaminated liquid flows into the open center portion of the medial shell 12, the filter media 35, 37 are urged by the pressure of the contaminated liquid into supporting engagement with the screen 15 of the upper shell 10 and the supporting screen 41, respectively. The fluid passes through the permeable filter media 35, 37, and contaminants therefrom will be accreted on the confronting or inner faces of the filter media, the filtrate fluid flowing into the shells 10, 11 and outwardly therefrom through the filtrate conduits 16.

When sufficient contaminants have accreted upon the confronting faces of the media 35, 37 to require renewal of the filter media, the flow of contaminated fluid is interrupted, the upper shell 10 is drained of fluid and the seals 17 are deflated. This operation may be in response to a pressurestat control in any one of the three shells 10, 11, 12 or in response to a timer actuation. Preferably, air under pressure is introduced into the upper shell 10 to force fluid therefrom downwardly through the media 35, 37 into the lower shell 11. Once the upper shell is empty, the seals are deflated, the motor 46 is actuated to advance the screen 41 to the left (as viewed in FIGURE 1). The weight of the filter media 35, 37 and the contaminants thereon forces both the filter media 35, 37 downwardly onto the conveyor screen 41. Advancement of the screen to the left allows the filter media to pass over the lefthand roll 42 for ultimate disposal.

Thus, it will be seen that the device of FIGURES 1 through 3 affords a dual filtering area utilizing separate and distinct filter media. Further, contaminants accrete at the inner facing surfaces of the filter media only inwardly of the flanges 23, 24 of the medial shell. Even though the upper medium has contaminant on its under-surface, there is no interference between such contaminants and the medial shell 12, any contaminants which fall from the upper media during removal of the media merely fall onto the lower medium, to be advanced therewith, and the superimposed media with contaminant therebetween can be easily disposed of in an efficient and clean manner after their removal from the filtration apparatus.

Figure 4:
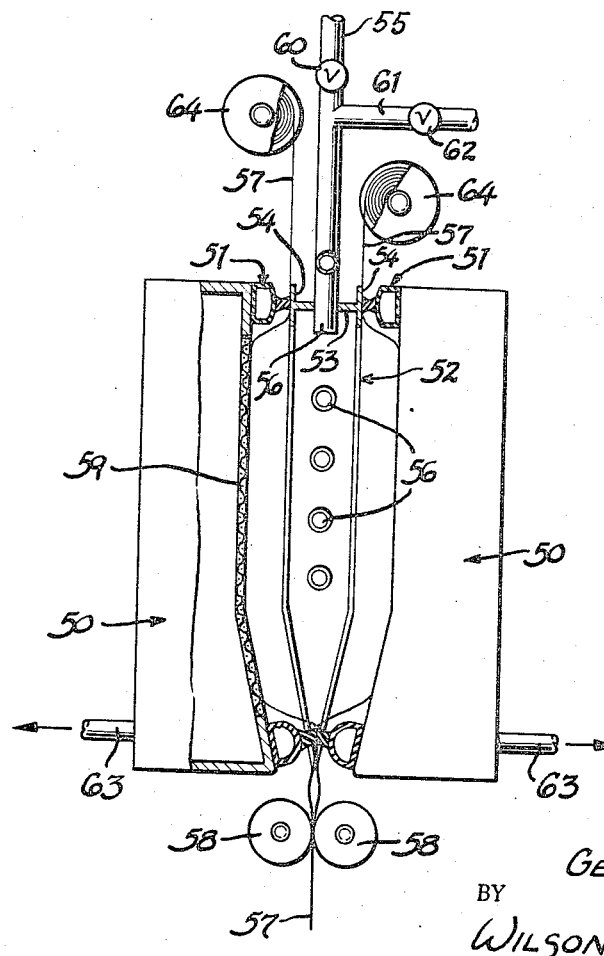
FIGURE 4 is a view similar to FIGURE 1, but illustrating a modified form of apparatus.

In the embodiment of the invention illustrated in FIGURE 4 of the drawings, the operation of the device is substantially the same as that earlier described, with the exception that here the outer shell and the medial shell are arranged so that the media extend vertically therebetween.

More specifically, identical, laterally spaced shells 50 are provided, the shells being generally rectangular and carrying peripheral seals 51, identical with the seals 17 heretofore described. Interposed between the shells is a central shell 52 which is U-shaped, as heretofore described, the shell being formed of I-beams having a central web 53 interposed between terminal flanges 54. The central or medial shell 52 tapers downwardly to a lower exit end at which the striker beads of the two seals 51 contact one another. The outer shells 50 are correspondingly tapered at their confronting inner faces. The remainder of the striker beads of the seals 51 contact the beam flanges 54 and serve to seal the shells 50 to the interposed central shells 52.

Contaminated fluid is supplied to a central shell by means of a supply pipe 55 from which individual conduit lengths 56 project through the web 53. A pair of filter media 57 are interposed between the outer shells 50 respectively, and the center shell 52. The pair of pinch rolls 58 are provided to move the media relatively downwardly for renewal, the media being supplied from overhead supply rolls 64.

The entry of contaminated liquid under pressure into the central shell 52 will displace the media 57 into contact with foraminous supporting surfaces 59 provided at the confronting surfaces of the shells 50. A first valve 60 is provided in the conduit 55 to control the flow of contaminated liquid, and a branch air line 61 is provided with an air control valve 62, so that air can also be introduced through the conduits 55 and 56.

The operation of the device of FIGURE 4 will be readily apparent. Normally, contaminated liquid is introduced through the open valve 60 and the conduits 55 and 56 into the central shell 52, such contaminated liquid flowing outwardly therefrom through the filter media 57 to exit through filtrate outlets 63 for the shells 50, respectively.

When the media 57 becomes clogged, it is merely necessary to close the valve 60, thereby shutting off the flow of contaminated liquid, open the valve 62 thereby introducing air under pressure through the conduits 55 and 56 into the center shell, this air under pressure forcing liquid from the shells 50 through the conduit 63.

Once the shells 50 are empty, the seals 51 are deflated and the pinch rolls 58 are actuated to pull the used portions of the media 57 from their positions intermediate the shells 50, 52 and to draw new media from the rolls 64 of such media into position to be clamped when the seals 51 are re-inflated. After the media 57 have been so sealed in position, the valve 60 is opened, and contaminated fluid again flows into the center shell 52 to be filtered at the media 57.

What I claim as new is:

1. In a filtering apparatus, a pair of spaced fluid conducting shells having open and aligned fluid permeable faces circumscribed by rectilinear edges, a medial shell interposed between said pair of shells, said medial shell being rectilinearly U-shaped in configuration to surround on three sides open faces aligned with and parallel to the permeable faces of said pair of shells, each medial shell face having three sealing edges spaced from and parallel to the corresponding edges of the confronting fluid permeable faces of said pair of shells, inflatable seals carried by said edges of said fluid permeable faces of said pair of shells, respectively, said seals being inflatable into sealing relation with the three edges of said medial shell and into sealing relation with one another at the open edge of the U-shaped medial shell, separate and distinct filter media interposed between said medial shell and each of said pair of shells, respectively, and retained in position therebetween by said seals, means for introducing contaminated liquid into said medial shell and means for removing filtrate fluid from each of said pair of shells, the fluid thus flowing through said filter media, respectively, into said pair of shells to accrete contaminants on said media.

2. In a method of filtering contaminants from a fluid in which such contaminants are suspended, the steps of contacting the opposing surfaces of a medial shell with separate filter media, clamping said media to said surfaces in sealed relation thereto by a pair of spaced outer shells, flowing fluid from said medial shell through said media and into said outer shells to accrete contaminants on the facing surfaces of said media, respectively, releasing said media from said sealed relation, and jointly removing said media with said contaminants confined therebetween.

3. In a filtering apparatus, a pair of vertically spaced fluid conducting shells having confronting fluid permeable faces, a medial fluid-conducting shell interposed between said pair of shells, disposable filter media extending substantially horizontally and interposed between each of said pair of shells and said medial shell, respectively, means for supplying contaminated fluid to said medial shell and for removing filtrate fluid from said pair of shells so that any contaminate in said fluid is removed at said media as the fluid flows outwardly from said medial shell to the others of said shells, an inflatable seal for sealing said shells to one another with said media therebetween, and conveyor means interposed between the lower of said pair of shells and the lower of said media for removing both of said media and any contaminate accreted on the confronting faces thereof when said shells are in non-sealed relation.

4. In a filter apparatus, first and second spaced fluid conducting shells of rectangular configuration and having confronting apertured sides, a hollow, medial shell interposed between said first and second shells and having side walls defining three sides only of an open center space, the remaining side thereof being open, separate and distinct filter media disposed between each of said first and second shells and said medial shell, respectively, means for sealing each of said first and second shells to said side walls of said medial shell and to one another at said remaining side with said media therebetween, means for introducing contaminated fluid into said medial shell, means for removing filtrate liquid from said first shell and said second shell, respectively, and means for removing the media from their interposed position through said open remaining side of said medial shell.

5. In a method of filtering contaminants from a fluid containing such contaminants in an apparatus including first and second spaced fluid conducting shells and a third shell interposed between said first and second shells, the steps of interposing separate and distinct filter media between each of said first and second shells and said third shell, respectively, said filter media having surfaces facing each other, sealing said shells and said filter media to one another with said media therebetween, introducing contaminated fluid into said third shell, flowing said contaminated fluid from said third shell through said filter media into said first and second shells to accrete contaminants on the facing surfaces of said media, removing filtrate liquid from said first shell and said second shell, respectively, releasing said media from said sealed relation, and jointly removing said filter media with said contaminants confined therebetween.

6. In a filtering apparatus, a pair of spaced fluid conducting shells having confronting fluid permeable faces, a medial fluid-conducting shell interposed between said pair of shells, disposable filter media interposed between each of said pair of shells, and said medial shell, respectively, an inflatable seal carried by at least one of said shells and engageable with the others of said shells to seal said shells to one another, means for supplying contaminated fluid to said medial shell, means for removing filtrate fluid from each of said pair of shells, the flow of fluid through said media depositing contaminants in the fluid on said filter media, and means for substantially simultaneously releasing the shells from sealing relation and advancing the media beyond the extent of the shells with the contaminant interposed therebetween.

7. In a filtering apparatus, a pair of spaced fluid conducting shells having confronting fluid permeable faces, a medial shell interposed bewteen said pair of shells, said medial shell being U-shaped in configuration and having a sealing face spaced from and parallel to the edges of the confronting fluid permeable faces of said pair of shells, seals carried by the edges of said confronting fluid permeable faces of said pair of shells, respectively, and actuatable into sealing relation with the faces of said medial shell, separate and distinct filter media interposed between said medial shell and each of said pair of shells, respectively, and retained in position therebetween by said seals, means for introducing contaminated liquid into said medial shell for flow through said filter media, respectively, into each of said pair of shells, means for removing filtrate liquid from each of said pair of shells and conveyor means adjacent said media and interposed between said medial shell and one of said pair of shells to convey the media from said interposed positions when said seals are released.

8. In a method of filtering contaminants from a fluid containing such contaminants, the steps of placing separate disposable filter media on opposite surfaces of a medial shell, sealing said filter media to said surfaces and to corresponding surfaces of a pair of outer shells positioned on opposite sides of said medial shell, flowing fluid from said medial shell through said media and into said outer shells to accrete contaminants on the facing surfaces of said media, releasing said media from said sealed relation, jointly removing said media with said contaminants confined therebetween by moving said media out from between said shells, and disposing of said filter media.

9. In a filtering apparatus, a pair of spaced fluid conducting shells having confronting fluid permeable faces and sealing portions about said faces, a medial shell interposed between said pair of shells and having sealing portions spaced from and parallel to the sealing portions of said pair of shells, separate and distinct filter media interposed between said medial shell and each of said pair of shells, respectively, said filter media being portions of continuous lengths of filter media retained in said apparatus, seals carried by said shells on at least two of said sealing portions and acutatable to seal said filter media to and between said shells, means for introducing contaminated liquid into said medial shell for flow through said media, respectively, into each of said pair of shells, means for removing said filtrate liquid from each of said pair of shells, and means to remove contaminated filter media portions from said interposed positions and to simultaneously move fresh portions of said filter media lengths into said interposed positions when said seals are released, the contaminants being carried out of said apparatus on confronting faces of said contaminated filter media portions.

References Cited

UNITED STATES PATENTS

| | | | |
|---|---|---|---|
| 1,778,342 | 10/1930 | Thompson | 210—401 X |
| 2,867,324 | 1/1959 | Hirs | 210—387 X |
| 3,117,083 | 1/1964 | Przhilensky | 210—230 X |

REUBEN FRIEDMAN, *Primary Examiner.*

J. L. DE CESARE, *Assistant Examiner.*